United States Patent
Kim et al.

(10) Patent No.: US 8,471,893 B2
(45) Date of Patent: Jun. 25, 2013

(54) METHOD AND APPARATUS FOR GENERATING STEREOSCOPIC IMAGE BITSTREAM USING BLOCK INTERLEAVED METHOD

(75) Inventors: Yong-tae Kim, Seoul (KR); Jae-seung Kim, Yongin-si (KR); Seong-sin Joo, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1233 days.

(21) Appl. No.: 12/124,739

(22) Filed: May 21, 2008

(65) Prior Publication Data
US 2009/0002481 A1   Jan. 1, 2009

Related U.S. Application Data

(60) Provisional application No. 60/946,241, filed on Jun. 26, 2007.

(30) Foreign Application Priority Data

Aug. 9, 2007   (KR) .................. 10-2007-0080329

(51) Int. Cl.
*H04N 13/00*   (2006.01)
(52) U.S. Cl.
USPC ............ 348/42; 348/46; 348/47; 348/51
(58) Field of Classification Search
None
See application file for complete search history.

(56) References Cited

U.S. PATENT DOCUMENTS

| | | | |
|---|---|---|---|
| 5,612,735 A * | 3/1997 | Haskell et al. | 348/43 |
| 5,652,616 A * | 7/1997 | Chen et al. | 348/42 |
| 6,075,556 A | 6/2000 | Urano et al. | |
| 6,965,699 B2 * | 11/2005 | Jeong et al. | 382/232 |
| 7,177,357 B2 * | 2/2007 | Yun et al. | 375/240.01 |
| 7,693,221 B2 * | 4/2010 | Routhier et al. | 375/240.26 |
| 7,746,931 B2 * | 6/2010 | Kato et al. | 348/42 |
| 7,782,937 B2 * | 8/2010 | Yun et al. | 375/240.01 |
| 2004/0008893 A1 | 1/2004 | Itoi et al. | |
| 2005/0117637 A1 | 6/2005 | Routhier et al. | |

FOREIGN PATENT DOCUMENTS

| | | | |
|---|---|---|---|
| JP | 07123447 A | | 5/1995 |
| JP | 2001054141 A | * | 2/2001 |
| JP | 2006128818 A | * | 5/2006 |
| KR | 1020030056267 A | | 7/2003 |

* cited by examiner

*Primary Examiner* — Jeffrey R Swearingen
(74) *Attorney, Agent, or Firm* — Sughrue Mion, PLLC

(57) ABSTRACT

Provided are a method and apparatus for generating a stereoscopic image bitstream. The method includes dividing a base view image and an additional view image into blocks having a predetermined size, generating a combined image by combining the blocks of the base view image and the blocks of the additional view image, recording the combined image in a payload area of the stereoscopic image bitstream, and recording block combination pattern information about a pattern of arranging the blocks of the base view image and the additional view image in the combined image, in a header area of the stereoscopic image bitstream.

20 Claims, 7 Drawing Sheets

| StereoScopic_BlockPattern | Meaning |
|---|---|
| 0 | Check pattern |
| 1 | Vertical interleaving type |
| 2 | Horizontal interleaving type |
| 3 | User private |

METHOD AND APPARATUS FOR GENERATING STEREOSCOPIC IMAGE BITSTREAM USING BLOCK INTERLEAVED METHOD

CROSS-REFERENCE TO RELATED PATENT APPLICATION

This application claims priority from U.S. Provisional Application No. 60/946,241, filed on Jun. 26, 2007 in the U.S. Patents and Trademark Office, and Korean Patent Application No. 10-2007-0080329 filed on Aug. 9, 2007, in the Korean Intellectual Property Office, the disclosures of which are incorporated herein in their entirety by reference.

BACKGROUND OF THE INVENTION

1. Field of the Invention

Apparatuses and methods consistent with the present invention relate to generating a stereoscopic image bitstream, and more particularly, to generating a stereoscopic image format in a block unit and recording the stereoscopic image format in a stereoscopic image bitstream in order to efficiently compress or transmit a stereoscopic image formed of a base view image and an additional view image, and a structure of the stereoscopic image bitstream.

2. Description of the Related Art

Various methods of transmitting stereoscopic images exist. For example, standards such as MPEG-2 Multi-view Video Profile (MVP), a depth map transmitting method using MPEG-4 Multiple Auxiliary Component (MAC), and Multi-view Video Coding (MVC) of MPEG-4 AVC/H.264 have been established for efficient transmission of stereoscopic images.

However, such standards lack compatibility with a conventional two-dimensional (2-D) codec, and thus when a stereoscopic image is transmitted using the above-described standards, a user using a conventional 2-D reproducer cannot restore the stereoscopic image by decoding received data. Also, it is difficult to transmit 3-D images with the above-described standards, due to low channel capacity.

Accordingly, a method of combining a stereoscopic image into one image format and transmitting the image format has been developed. Representative examples of such a method include a side-by-side method and a top down method. In the side-by-side method, for example, the numbers of pixels in a row direction of a left image and a right image are reduced by half, respectively, and the reduced left and right images are respectively arranged as left and right sides of one combined image. In the top down method, for example, the numbers of pixels in a column direction of a left image and a right image are reduced by half, respectively, and the reduced left and right images are respectively arranged as the top and bottom of one combined image.

However, the resolution of the combined image as described above is reduced to half the resolution of the original image while reducing the number of pixels. Consequently in a conventional 2-D reproducer, a viewer may feel uncomfortable with the combined image, since the halves of the left and right images are shown. Also, when compressing or transmitting the combined image, compression efficiency deteriorates since correlation of left and right images are not considered.

A method of forming a single image format by combining left and right images in a pixel unit also exists.

FIG. 1A is a diagram illustrating a stereoscopic image format in a pixel unit for transmitting a stereoscopic image.

Pixels of a left view image and a right view image are sampled in a lattice unit, a right image is moved by one pixel in such a way that a left image and the right image are not overlapped, and then the right image is sampled. Accordingly, a single image format for a stereoscopic image is formed. A conventional 2-D encoder and decoder are used to transmit/receive the stereoscopic image. Since the left image and right image are formed as one stereoscopic image format having the same resolution, some pixels of the stereoscopic image format are lost.

FIG. 1B is a diagram illustrating an apparatus for restoring lost pixels of a stereoscopic image format in pixel units.

In order for a display device to reproduce an image in its original resolution, the lost pixels should be restored while generating the stereoscopic image format of FIG. 1A. Accordingly, values of an image sampled in a pixel unit are extracted in a direction, each directional pixel value is multiplied by a predetermined weight, and then the directional pixel values are all added in order to restore the original left and right images.

A stereoscopic image transmitting method includes an image format technology forming left and right images in field units.

FIG. 2A is a diagram illustrating a stereoscopic image format in field units. In FIG. 2A, input left and right images are vertically arranged each in one line and then are formatted to a sequential field unit. Then, the left and right images are transmitted and received.

FIG. 2B is a block diagram of a transmitting unit and a receiving unit of a stereoscopic image format in field units.

Referring to FIG. 2B, the transmitting unit and receiving unit includes a pre-processor 201 and a post-processor 211. The pre-processor forms and encodes a stereoscopic image format, and the post-processor restores a stereoscopic image by decoding the stereoscopic image format. Left and right images converted to pixel units are compressed by an MPEG encoder 202. Since MPEG, excluding MPEG-1, supports a compressing method of pixel units, MPEG has a structure that maintains compression efficiency while performing DCT in block units, and motion estimation and variation estimation.

According to the stereoscopic image format technology of FIG. 1A, left and right images are combined in a pixel unit in order to form a single stereoscopic image format. Accordingly, correlation between pixels is low, and thus performance of a DCT encoder according to an image standard, such as JPEG, MPEG, or H.26X, deteriorates, and compression efficiency decreases. Also, conventional stereoscopic image format technology including the stereoscopic image formats of FIGS. 1A and 2A does not define a pre-processor or a post-processor of a stereoscopic image. Accordingly, when the stereoscopic image format is decoded, left and right images are alternatively displayed in field units, and thus a serious flickering effect may be experienced by a user.

SUMMARY OF THE INVENTION

The present invention provides a method and apparatus for generating a stereoscopic image bitstream, wherein a combined image format is formed by combining information about a base view image and an additional view image in block units, and the combined image format is recorded in the stereoscopic image bitstream, for efficient compression or transmission of a stereoscopic image.

The present invention also provides a method and apparatus for generating a stereoscopic image bitstream, wherein structure information of a combined image format is recorded in header information, for a receiving unit to accurately restore a base view image and an additional view image using a combined image of the stereoscopic image bitstream.

According to an aspect of the present invention, there is provided a method of generating a stereoscopic image bitstream, including: dividing a base view image and an additional view image into blocks having a predetermined size; generating a combined image by combining the blocks of the base view image and the blocks of the additional view image, and recording the combined image in a payload area of the stereoscopic image bitstream; and recording block combination pattern information about a pattern of arranging the blocks of the base view image and the additional view image in the combined image, in a header area of the stereoscopic image bitstream.

The method may further include recording frame arrangement pattern information about a pattern of arranging the blocks of the base view image and the additional view image of the combined image according to a frame, in the header area.

The method may further include recording block size information about the size of the blocks of the base view image and the additional view image, in the header area.

When the combined image is divided into blocks of N rows and M columns, where x is an integer in a range of $0 \leq x < N/2$, y is an integer in a range of $0 \leq y < M/2$, and a (x, y)th block is located in the xth row and yth column, the block combination pattern information may include: a block combination pattern in which a (2x, 2y)th block and a (2x+1, 2y+1)th block of the combined image are respectively a (2x, 2y)th block and a (2x+1, 2y+1)th block of any one of the base view image and the additional view image, and a (2x, 2y+1)th block and a (2x+1, 2y)th block of the combined image are respectively a (2x, 2y+1)th block and a (2x+1, 2y)th block of the other view image.

When the combined image is divided into blocks of N rows and M columns, where x is an integer in a range of $0 \leq x < N/2$, y is an integer in a range of $0 \leq y < M$, and a (x, y)th block is located in the xth row and yth column, the block combination pattern information may include: a block combination pattern in which a (2x, y)th block of the combined image is a (2x, y)th block of any one of the base view image and the additional view image, and a (2x+1, y)th block of the combined image is a (2x+1, y)th block of the other view image.

When the combined image is divided into blocks of N rows and M columns, where x is an integer in a range of $0 \leq x < N$, y is an integer in a range of $0 \leq y < M/2$, and a (x, y)th block is located in the xth row and yth column, the block combination pattern information may include: a block combination pattern in which a (x, 2y)th block of the combined image is a (x, 2y)th block of one of the base view image and the additional view image, and a (x, 2y+1)th block of the combined image is a (x, 2y+1)th block of the other view image.

The block combination pattern information may include a predetermined block combination pattern, in which the blocks of the base view image and the additional view image are combined according to a block combination pattern selected by a user.

According to the block combination pattern information, a block of the base view image may be arranged in a first block location of the combined image, and a block of the additional view image, which has the highest similarity by using a disparity estimation method with a block in the second block location of the base view image, may be arranged in a second location of the combined image, when the second block location is not the same as the first block location.

The frame arrangement pattern information may include an arrangement order, wherein a first block location, in which a block of the base view image is arranged, and a second block location, in which a block of the additional view image is arranged, maintain the same location in each frame of the combined image.

When a block of the base view image is arranged in a first block location and a block of the additional view image is arranged in a second block location, the frame arrangement pattern information may include: an arrangement order wherein a first block location of a current frame of the combined image becomes a second block location of a next frame of the combined image, and a second block location of the current frame becomes a first block location of the next frame.

When the number of rows of pixels of the blocks and the number of columns of pixels of the blocks is the same, the block size information may be determined to be one number.

In the block size information, the number of rows of pixels of the blocks and the number of columns of pixels of the blocks may be each determined.

According to another aspect of the present invention, there is provided an apparatus for generating a stereoscopic image bitstream, including: a block divider, which divides a base view image and an additional view image into predetermined blocks having a predetermined size; a combined image recorder, which records a combined image, generated by combining the blocks of the base view image and the additional view image, in a payload area of the stereoscopic image bitstream; and a block combination pattern information recorder, which records block combination pattern information about an order of arranging the blocks of the base view image and the additional view image in the combined image, in a header area of the stereoscopic image bitstream.

According to another aspect of the present invention, there is provided a structure of a stereoscopic image bitstream, including: a payload area, in which a combined image, formed by combining a block of a base view image and a block of an additional view image, is recorded; and a header area, in which block combination pattern information about a pattern of arranging a block of the base view image and a block of the additional view image in the combined image, frame arrangement pattern information about a pattern of arranging a block of the base view image and a block of the additional view image in the combined image according to frame, and block size information about the size of blocks of the base view image and the additional view image are recorded.

According to another aspect of the present invention, there is provided a computer readable recording medium having recorded thereon a program for executing a method as described above.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

Hereinafter, the present invention will be described more fully with reference to the accompanying drawings, in which exemplary embodiments of the invention are shown.

Figures 1A, 1B:
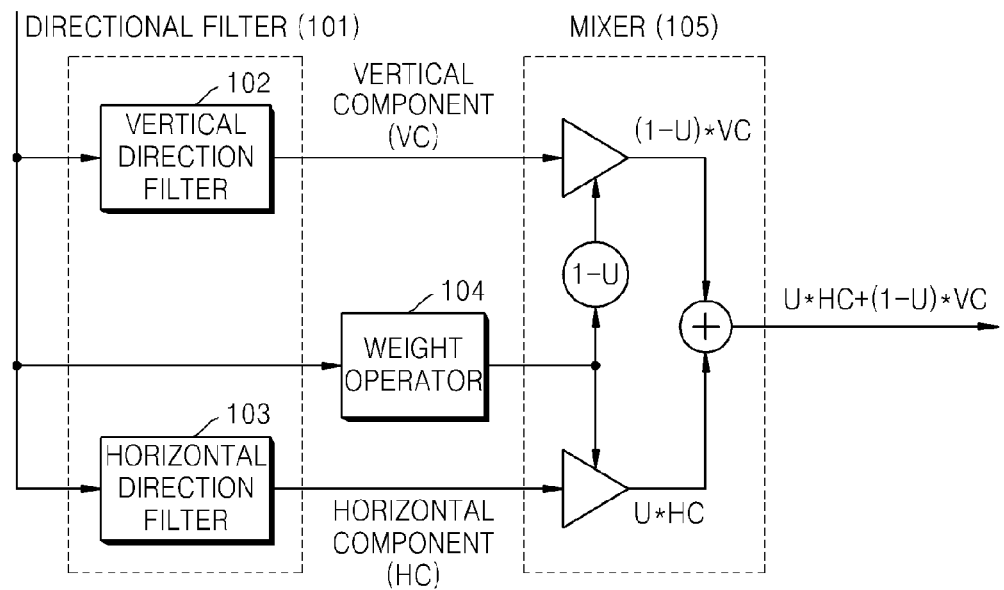
FIG. 1A is a diagram illustrating a stereoscopic image format in pixel units for transmitting a stereoscopic image.
FIG. 1B is a diagram illustrating an apparatus for restoring lost pixels of a stereoscopic image format in units of pixels.
Figure 2A:
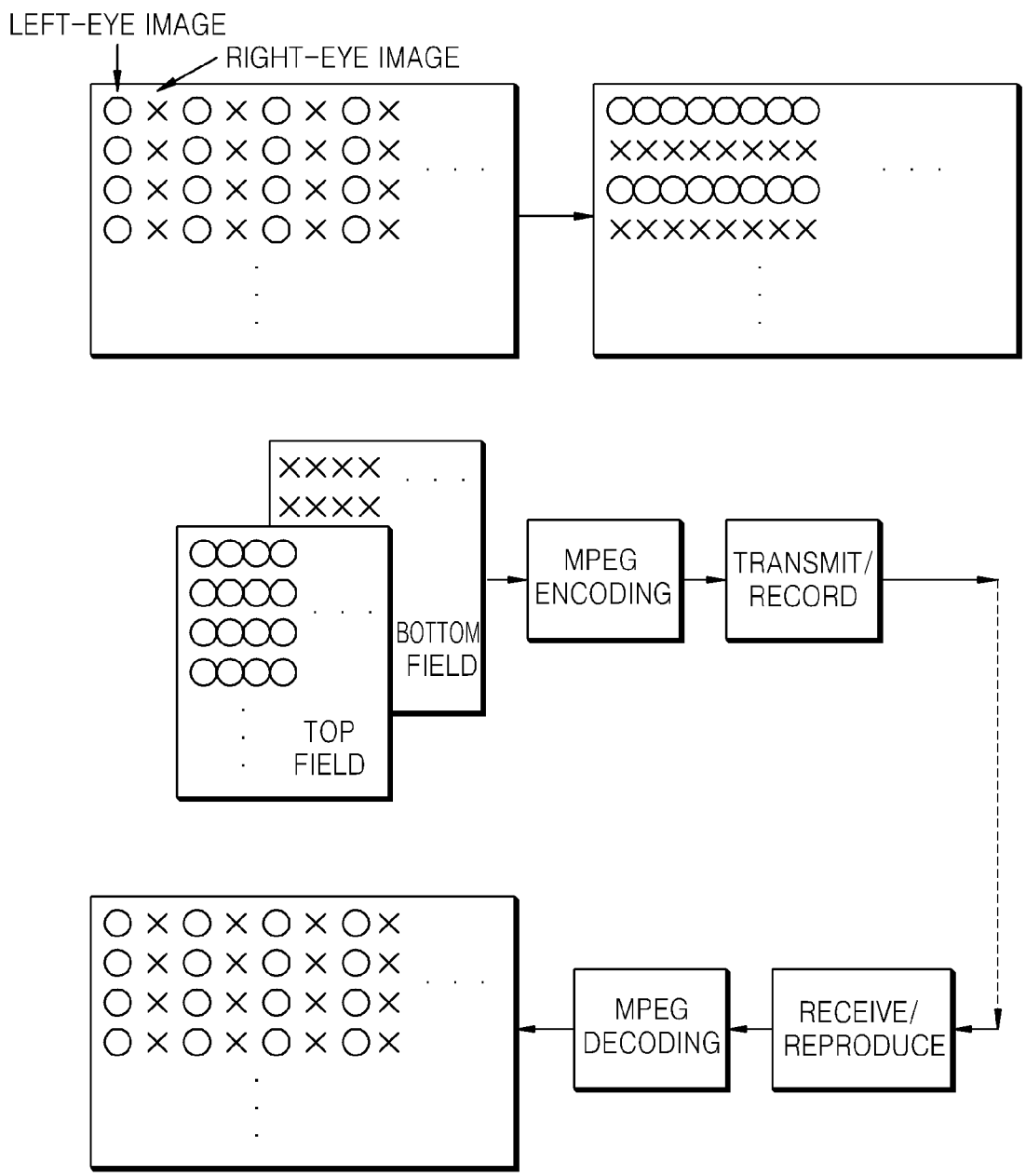
FIG. 2A is a diagram illustrating a stereoscopic image format in field units.
Figure 2B:
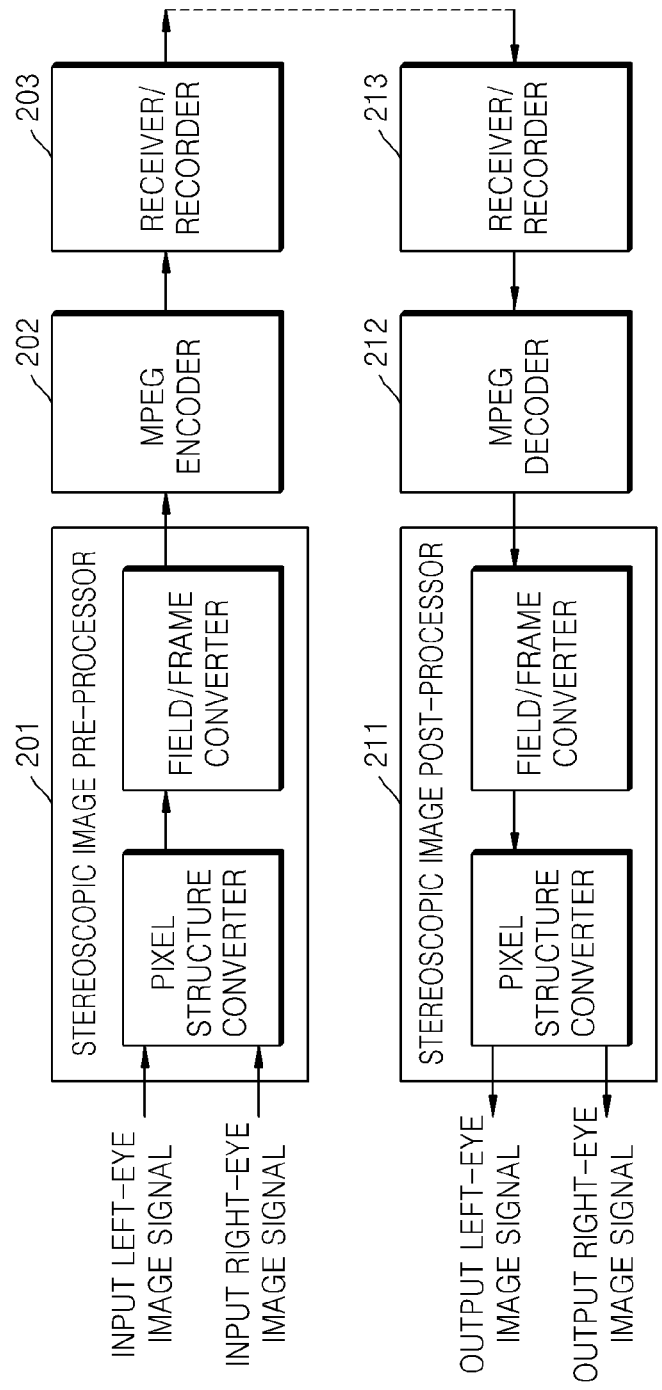
FIG. 2B is a block diagram of a transmitting unit and a receiving unit of a stereoscopic image format in units of fields.
Figure 3:
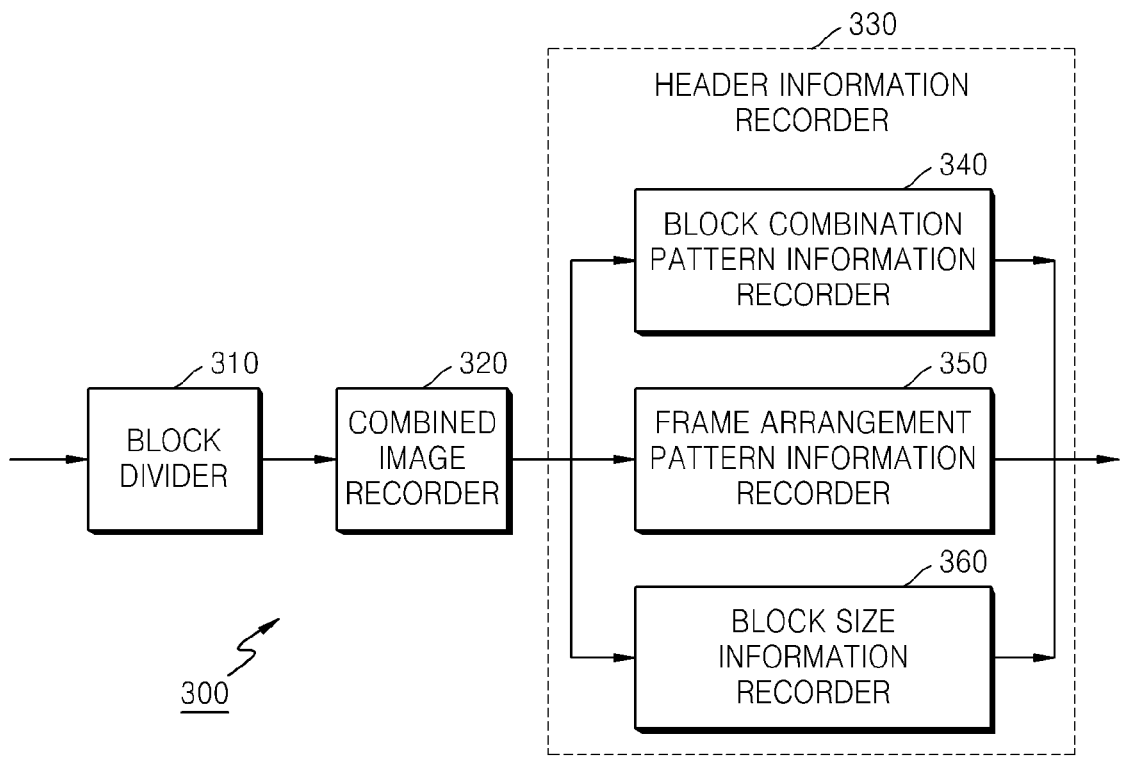
FIG. 3 is a block diagram illustrating an apparatus for generating a stereoscopic image bitstream, according to an exemplary embodiment of the present invention.

FIG. 3 is a block diagram illustrating an apparatus 300 for generating a stereoscopic image bitstream, according to an exemplary embodiment of the present invention.

Referring to FIG. 3, the apparatus 300 according to the exemplary embodiment of the present invention includes a block divider 310, a combined image recorder 320, and a header information recorder 330. The header information recorder 330 includes a block combination pattern information recorder 340, a frame arrangement pattern information recorder 350, and a block size information recorder 360.

The block divider 310 divides a base view image and an additional view image into blocks having a predetermined size, and outputs the divided base view image and additional view image in block units to the combined image recorder 320. Here, the size of the blocks may have the same number of rows as columns of pixels, such as 4×4 or 8×8, or may have different numbers of rows and columns of pixels, such as 4×8 or 16×8.

Upon receiving the divided base view image and additional view image from the block divider 310, the combined image recorder 320 records a combined image, which is generated by combining the blocks of the base view image and additional view image, in a payload area of the stereoscopic image bitstream, and outputs the stereoscopic image bitstream to the header information recorder 330.

The header information recorder 330 receives the stereoscopic image bitstream, which is processed in block units, from the combined image recorder 320, records combination information in a header area of the stereoscopic image bitstream about a method of combining the blocks of the base view image and additional view image in order to form the combined image, and outputs the combination information.

The combination information recorded in the header information recorder 330 is recorded by the block combination pattern information recorder 340, the frame arrangement pattern information recorder 350, and the block size information recorder 360.

The block combination pattern information recorder 340 receives the stereoscopic image bitstream from the combined image recorder 320, records block combination pattern information in the header area of the stereoscopic image bitstream about an order of arranging the blocks of the base view image and additional view image in the combined image, and outputs the stereoscopic image bitstream. The block combination pattern information will be described later with reference to FIGS. 6A to 6D.

The frame arrangement pattern information recorder 350 receives the stereoscopic image bitstream from the combined image recorder 320, records frame arrangement pattern information, about a pattern of arranging the blocks of the base view image and additional view image of the combined image according to frame, in the header area, and outputs the stereoscopic image bitstream. The frame arrangement pattern information will be described later with reference to FIGS. 7A and 7B.

The block size information recorder 360 receives the stereoscopic image bitstream from the combined image recorder 320, records block size information in the header area about the size of the blocks of the base view image and additional view image, and outputs the stereoscopic image bitstream.

According to an exemplary embodiment of the present invention, when the block size information is determined to be one number, the number of pixels in a row and the number of pixels in a column of the block are the same. Accordingly, when the block size information is determined to be one number, the block is a square.

According to another exemplary embodiment of the present invention, the numbers of rows and columns of pixels may be each determined, and thus the block may be a square or a rectangle.

Figure 4:
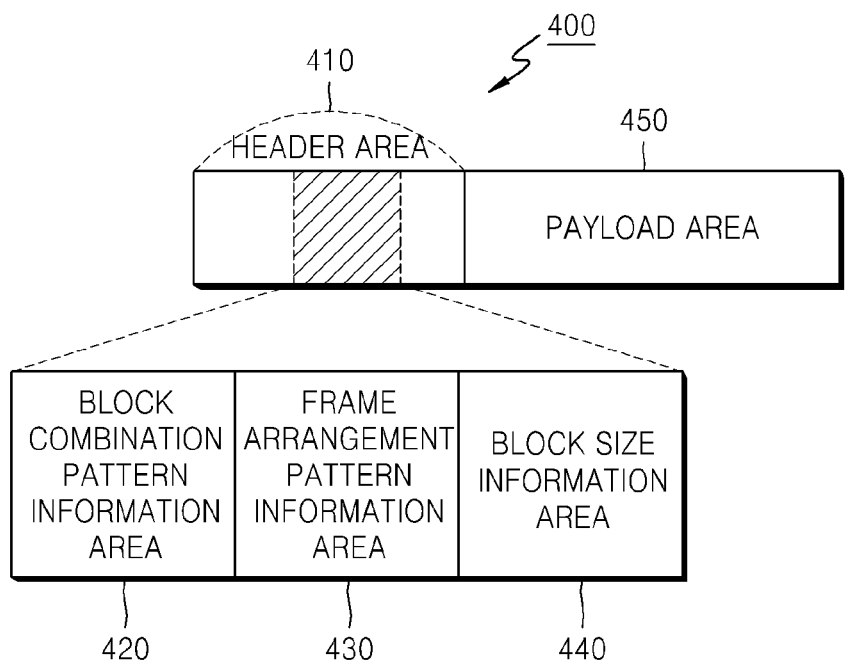
FIG. 4 is a diagram illustrating a structure of a stereoscopic image bitstream according to an exemplary embodiment of the present invention.

FIG. 4 is a diagram illustrating a structure of a stereoscopic image bitstream 400 according to an exemplary embodiment of the present invention.

Referring to FIG. 4, the stereoscopic image bitstream 400 according to the exemplary embodiment includes a header area 410 and a payload area 450. The header area 410 includes a block combination pattern information area 420, a frame arrangement pattern information area 430, and a block size information area 440. The stereoscopic image bitstream 400 is generated by the apparatus 300 illustrated in FIG. 3.

Header information, which defines various characteristics of data that is to be recorded in the payload area 450 by the header information recorder 330 of FIG. 3, is recorded in the header area 410. For example, the header information may define characteristics, such as a size, processing method, recording time, and an acquiring method of the data.

A combined image, generated by combining blocks of a base view image and an additional view image, is recorded in the payload area 450 by the combined image recorder 320 of FIG. 3.

Block combination pattern information is recorded in the block combination pattern information area 420 by the block combination pattern information recorder 340 of FIG. 3.

Frame arrangement pattern information is recorded in the frame arrangement pattern information area 430 by the frame arrangement pattern information recorder 350 of FIG. 3.

Block size information is recorded in the block size information area 440 by the block size information recorder 360.

The block combination pattern information, the frame arrangement pattern information, and the block size information constitute the header information that is defined as predetermined numbers, and are respectively recorded in the block combination pattern information area 420, the frame arrangement pattern information area 430, and the block size information area 440.

Figure 5:
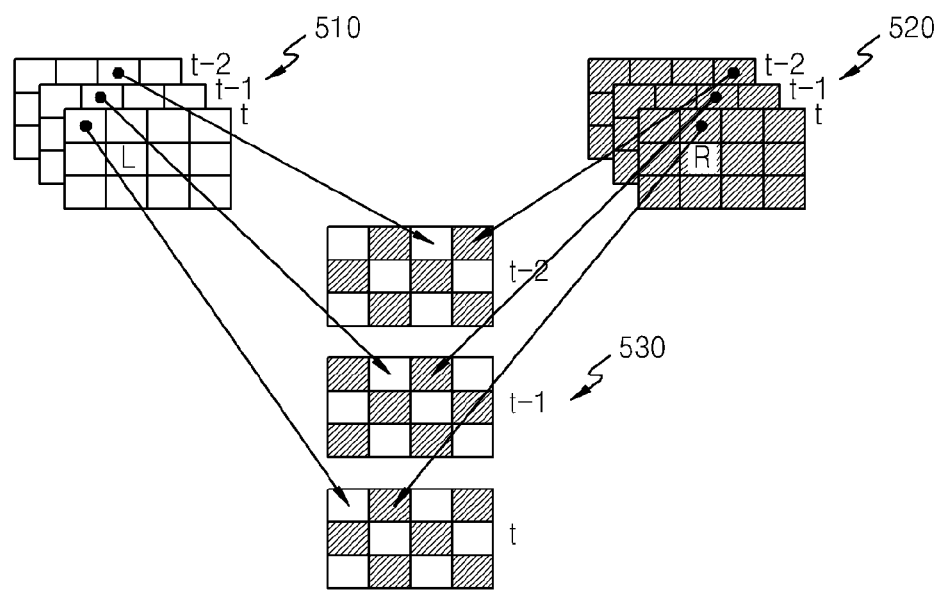
FIG. 5 is a diagram illustrating a combined image, in which a stereoscopic image is combined using a block interleaved method, according to an exemplary embodiment of the present invention.

FIG. 5 is a diagram illustrating a combined image 530, in which a stereoscopic image is combined using a block interleaved method, according to an exemplary embodiment of the present invention.

FIG. 5 is a diagram describing operations of the block divider 310 and the combined image recorder 320 of the apparatus 300 of FIG. 3, according to exemplary embodiments of the present invention.

Referring to FIG. 5, a left view image 510 shows t-2th, t-1th, and tth frames of a base view image, and a right view image 520 shows t-2th, t-1th, and tth frames of an additional view image.

The combined image 530 is a combined image formed by combining the base view image and the additional view image in units of blocks.

According to the exemplary embodiment, the left view image 510 is selected as the base view image, and the right view image 520 is selected as the additional view image.

The block divider 310 divides the base view image 510 and the additional view image 520 into blocks of a predetermined size, and the combined image recorder 320 generates the combined image 530 by combining the blocks of the base view image 510 and the additional view image 520.

When a location of blocks of the base view image 510 arranged in the combined image 530 is referred to as a first block location, the combined image recorder 320 arranges the blocks in the first block location of the base view image 510 in the first block location of the combined image 530.

When a location of blocks of the additional view image 520 arranged in the combined image 530 is referred to as a second block location, the combined image recorder 320 arranges the blocks in the first block location of the additional view image 520 in the second block location of the combined image 530.

Alternatively, a block of the additional view image 520 having the highest similarity to a block of the base view image 510 in the second block location is arranged in the second block location of the combined image 530 through variation estimation.

A method of finding a block having the highest similarity through variation estimation is performed by finding a block of the additional view image 520 that has the least sum of absolute difference (SAD) with a block of the base view image 510. Alternatively, a block of the additional view image 520 may be found using a variation estimation method that is well known to one of ordinary skill in the art.

Block combination pattern information will now be described with reference to FIGS. 6A to 6D.

Figure 6A:
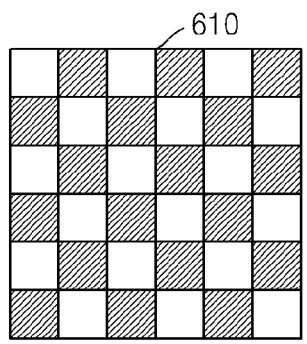
FIGS. 6A-6C are diagrams illustrating combined images according to examples of block combination pattern information.
Figure 6B:
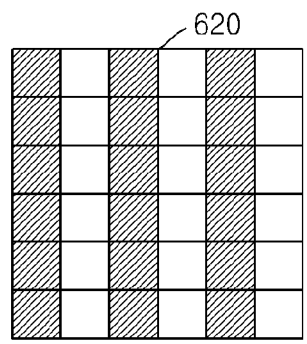
Figure 6C:
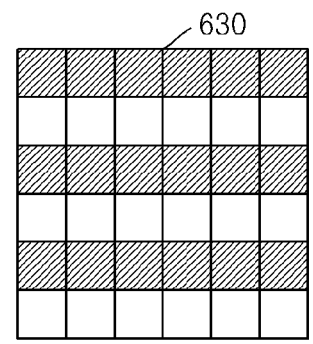

FIG. 6A to 6C are diagrams illustrating combined images according to examples of block combination pattern information.

A block combination pattern, which is a pattern obtained by combining blocks of a base view image and an additional view image by the combined image recorder 320 of FIG. 3, will now be described with reference to FIGS. 6A to 6C.

Referring to FIG. 6A to 6C, examples of the block combination pattern include a block combination pattern 610 as shown in FIG. 6A, a block combination pattern 620 as shown in FIG. 6B, and a block combination pattern 630 as shown in FIG. 6C.

For convenience, let's assume that the base view image, the additional view image, and the combined image are divided into blocks of N rows and M columns, where x is an integer in a range of $x \geq 0$, y is an integer in a range of $y \geq 0$, and (x, y)th block is located in the xth row and yth column.

When x<N/2 and y<M/2, the block combination pattern 610 of FIG. 6A arranges corresponding blocks of the base view image 510 each in (2x, 2y)th block location and (2x+1, 2y+1)th block location in the combined image 530. Also, corresponding blocks of the additional view image 520 are each arranged in the remaining block locations, that is, (2x, 2y+1)th block location and (2x+1, 2y)th block location.

As described above, the blocks of the additional view image 520 are arranged in the top, bottom, left, and right block locations of the block location, in which the block of the base view image 510 is arranged, and in the same block locations of a previous frame and a next frame. Accordingly, blocks of the same view image are not continuously arranged in the combined image 530.

The blocks of the same view image are arranged discontinuously so that information about peripheral blocks can be used while restoring a stereoscopic image, as adjacent blocks of a predetermined block becomes a block of another view image. Accordingly, the locations of the blocks of the base view image 510 and the additional view image 520 can be determined variously, as long as the blocks of the same view image are discontinuously arranged.

When x<N and y<M/2, the block combination pattern 620 of FIG. 6B arranges a corresponding block of the base view image 510 in (x, 2y)th block location in the combined image 530. Also, a corresponding block of the additional view image 520 is arranged in the remaining block location, that is, (x, 2y+1)th block location.

When x<N/2 and y<M, the block combination pattern 630 of FIG. 6C arranges a corresponding block of the base view image 510 in (2x, y)th block location in the combined image 530. Also, a corresponding block of the additional view image 520 is arranged in the remaining block location, that is, (2x+1, y)th block location.

In the block combination patterns 610, 620, and 630 of FIGS. 6A to 6C respectively, a pattern of arranging blocks of the base view image 510 and a pattern of arranging blocks of the additional view image 520 can be exchanged.

Also, a location of a block of the additional view image 520 can be determined using variation estimation with a block of the base view image 510.

Figures 6D, 7A, 7B:
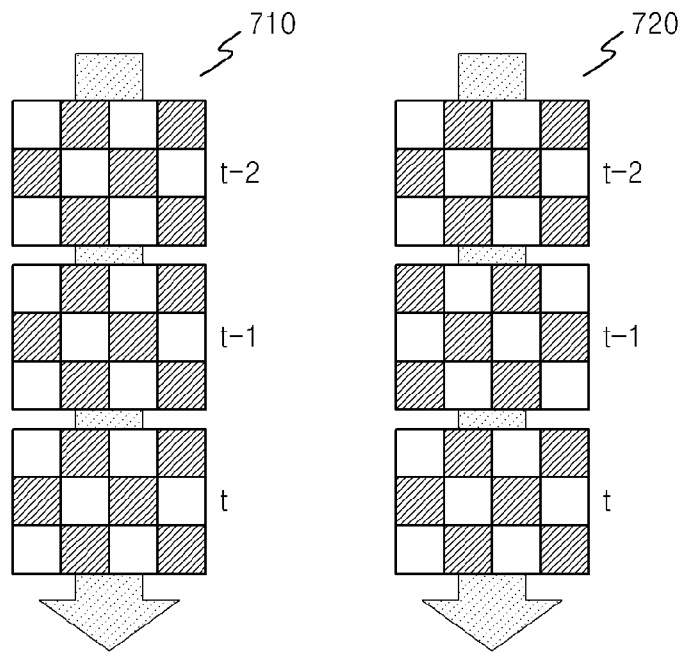
FIG. 6D is a table showing an example of block combination pattern information.
FIGS. 7A and 7B are diagrams illustrating examples of frame arrangement pattern information.

FIG. 6D is a table showing an example of block combination pattern information.

StereoScopic_BlockPattern denotes block combination pattern information.

Referring to the table of FIG. 6D, Check pattern denotes the block combination pattern 610 of FIG. 6A, Vertical interleaving type denotes the block combination pattern 620 of FIG. 6B, Horizontal interleaving type denotes the block combination pattern 630 of FIG. 6C, and User private denotes a block combination pattern assigned by a user.

FIG. 6D shows an example of setting block combination pattern information in order to record a pattern of combining blocks of a base view image and additional view image forming a combined image, in a header area of a stereoscopic image bitstream as header information.

In other words, when the combined image is formed in the block combination pattern 610 (check pattern) of FIG. 6A, the block combination pattern information (StereoScopic_BlockPattern) is set to be 0, when the combined image is formed in the block combination pattern 620 (Vertical interleaving type) of FIG. 6B, the block combination pattern information (StereoScopic_BlockPattern) is set to be 1. Similarly, when the combined image is formed in the block combination pattern 630 (Horizontal interleaving type) of FIG. 6C, the block combination pattern information (StereoScopic_BlockPattern) is set to be 2.

When the combined image is formed in a predetermined block combination pattern assigned by a user, the block combination pattern information (Stereo Scopic_BlockPattern) is set to be 3, in order to define the block combination pattern.

FIGS. 7A and 7B are diagrams illustrating examples of frame arrangement pattern information.

Operations of the combined image recorder 320 and the frame arrangement pattern information recorder 350 will now be described with reference to FIGS. 7A and 7B.

Referring to FIG. 7A, a frame arrangement pattern 710 shows a case when a frame arrangement pattern of blocks of a base view image and a frame arrangement pattern of blocks of an additional view image are the same in each frame.

A frame arrangement pattern 720 of FIG. 7B shows a case when a frame arrangement pattern of blocks of a base view image and a frame arrangement pattern of blocks of an additional view image are changed in each frame.

The combined image recorder 320 maintains a first block location, in which a block of the base view image is arranged, and a second block location, in which a block of the additional view image is arranged, to be the same in each frame of the combined image, like the frame arrangement pattern 710 of FIG. 7A.

Alternatively, the combined image recorder 320 changes the first block location of a current frame of the combined image to the second block location of a next frame of the combined image, and the second block location of the current frame to the first block location of the next frame, like the frame arrangement pattern 720 of FIG. 7B. Accordingly, a frame arrangement pattern changes in each frame, and the block arrangement pattern is equal in every second frame.

A discontinuous frame arrangement pattern, such as the frame arrangement pattern 720 of FIG. 7B, can use information about peripheral blocks while restoring a stereoscopic image as the discontinuous block combination pattern described above.

When the combined image is formed in the frame arrangement pattern 710 of FIG. 7A, the frame arrangement pattern information recorder 350 records the frame arrangement pattern information (StereoScopic_FramePattern) as 0. Also, when the combined image is formed in the frame arrangement pattern 720 of FIG. 7B, the frame arrangement pattern information (StereoScopic_FramePattern) is recorded as 1.

The block size information recorder 360 records block size information about the size of the blocks of the base view image, additional view image, and combined image in a header area of the stereoscopic image bitstream.

When the blocks are squares, the numbers of rows and columns of pixels are the same, and thus the block size information is one number.

However, when the blocks are rectangles, the numbers of rows and columns are not the same number, and are determined.

If the block combination pattern information (StereoScopic_Block Pattern) is 1 (vertical interleaving type), and the block size information (Stereo Scopic_BlockSize) is 16, a stereoscopic image A is divided into the square blocks, wherein the numbers of rows and columns of pixels are the same, as both are 16.

Also, a blocking artifact is minimized by determining a block of the additional view image using a variation estimation method. Upon receiving an image such as A, a restoring unit can divide the base view image and the additional view image using the block combination pattern information 420, the frame arrangement pattern information 430, and the block size information 440 of the stereoscopic image bitstream 400 illustrated in FIG. 4.

Figure 8:
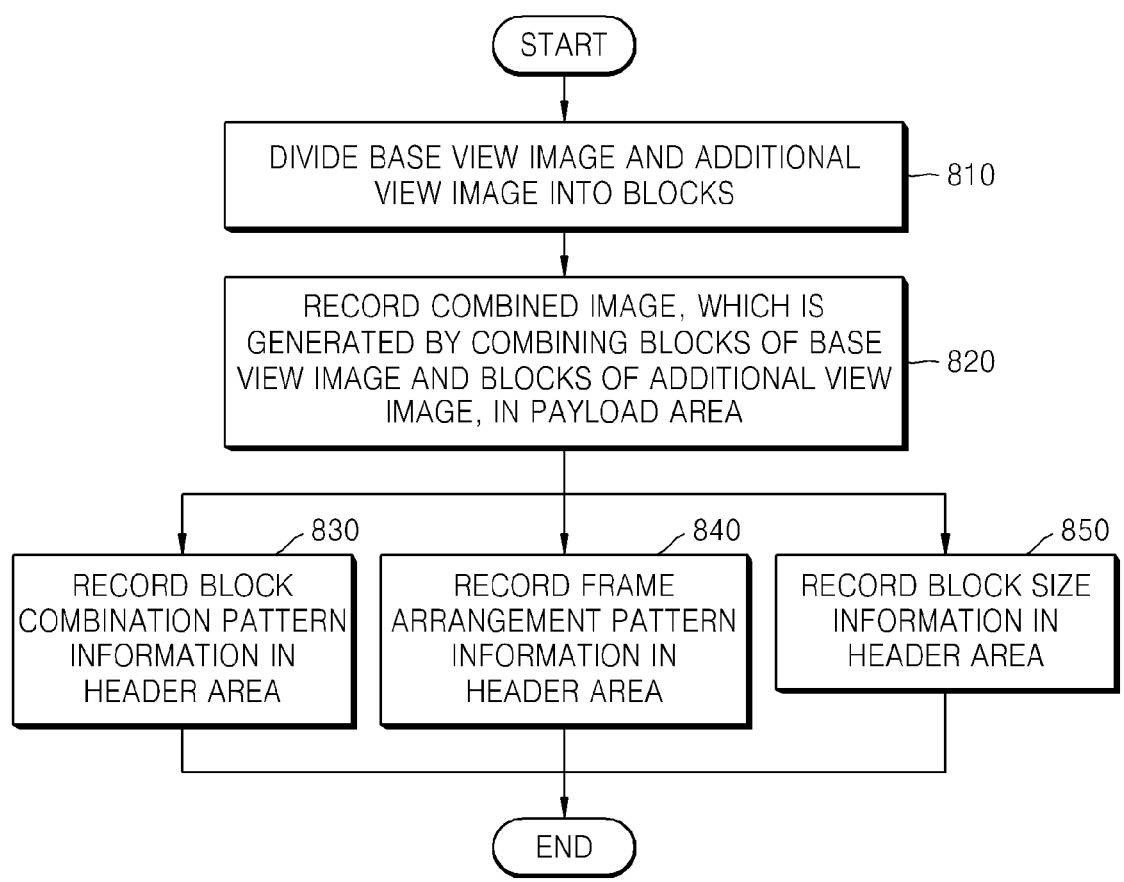
FIG. 8 is a flowchart illustrating a method of generating a stereoscopic image bitstream, according to an exemplary embodiment of the present invention.

FIG. 8 is a flowchart illustrating a method of generating a stereoscopic image bitstream, according to an exemplary embodiment of the present invention.

In operation 810, a base view image and an additional view image are divided into blocks having a predetermined size.

In operation 820, a combined image, which is generated by combining the blocks of the base view image and the blocks of the additional view image, is recorded in a payload area of the stereoscopic image bitstream.

In operation 830, block combination pattern information, regarding an order of arranging the blocks of the base view image and additional view image in a current frame of the combined image, is recorded in a header area of the stereoscopic image bitstream.

In operation 840, frame arrangement pattern information, regarding a pattern of arranging the blocks of the base view image and additional view image in the combined image according to each frame, is recorded in the header area.

In operation 850, block size information, regarding the size of the blocks of the base view image and additional view image, is recorded in the header area.

The exemplary embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), and storage media such as carrier waves (e.g., transmission through the Internet).

According to the present invention, a combined image is formed by combining a base view image and an additional view image in units of blocks. Accordingly, the stereoscopic image can be efficiently compressed, stored, or transmitted while maintaining the original resolution.

Also, the block combination pattern information, the frame arrangement pattern information, and the block size information are transmitted to the header area of the stereoscopic image bitstream as header information, and thus a receiving unit can accurately restore the base view image and the additional view image using the combined image and the header information.

In addition, an accurate block interleaved method can be realized by using the block combination pattern information, the frame arrangement pattern information, and the block size information, and thus a combined image can be reproduced even in a conventional 2-D reproducer.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of generating a stereoscopic image bitstream, the method comprising:
    dividing abuse view image and an additional view image into blocks;
    generating a combined image by combining the blocks of the base view image and the blocks of the additional view image;
    recording the combined image in a payload area of the stereoscopic image bitstream; and
    recording, in a header area of the stereoscopic image bitstream, block combination pattern information about a pattern of arranging the blocks of the base view image and the blocks of the additional view image in the combined image, wherein the block combination pattern information indicates whether a pattern of the combined image is one of first, second and third patterns, and wherein the first pattern indicates that, among blocks of the combined image, each block of the base view image is adjacent in vertical and horizontal directic its to the blocks of the additional view image and each block of the additional view image is adjacent in vertical and horizontal directions to the blocks of the base view image, the second pattern indicates that, among the blocks of the combined image, blocks of the same view image are serially arranged in the vertical direction and each block of the same view image is adjacent in the horizontal direction to blocks of the other view image, and the third pattern indicates that, among the blocks of the combined image, the blocks of the same view image are serially arranged in the horizontal direction and each block of the same view image is adjacent in the vertical direction to the blocks of the other view image.

2. The method of claim 1, further comprising recording, in the header area, frame arrangement pattern information about a pattern of arranging the blocks of the base view image and the blocks of the additional view image of the combined image according to a frame.

3. The method of claim 2, wherein the frame arrangement pattern information comprises an arrangement order, wherein a first block location, in which a block of the base view image is arranged, and a second block location, in which a block of the additional view image is arranged, maintain the same location in each frame of the combined image.

4. The method of claim 2, wherein a block of the base view image is arranged in a first block location and a block of the additional view image is arranged in a second block location, and the frame arrangement pattern information comprises:

an arrangement order wherein a first block location of a current frame of the combined image becomes a second block location of a next frame of the combined image, and a second block location of the current frame becomes a first block location of the next frame.

5. The method of claim 1, further comprising recording, in the header area, block size information about a size of the blocks of the base view image and the blocks of the additional view image.

6. The method of claim 5, wherein a number of rows of pixels of the blocks and a number of columns of pixels of the blocks are the same, and the block size information is one number.

7. The method of claim 5, wherein in the block size information, a number of rows of pixels of the blocks and a number of columns of pixels of the blocks is respectively determined.

8. The method of claim 1, wherein when the combined image is divided into blocks of N rows and M columns, where x is an integer in a range of $0 \leq x < N/2$, y is an integer in a range of $0 \leq y < M/2$, and an (x, y)th block is located in the xth row and yth column, and the block combination pattern information of the combined image is the first pattern, a (2x, 2y)th block and a (2x+1, 2y+1)th block of the combined image are respectively a (2x, 2y)th block and a (2x+1, 2y+1)th block of any one of the base view image and the additional view image, and a (2x, 2y+1)th block and a (2x+1, 2y)th block of the combined image are respectively a (2x, 2y+1)th block and a (2x+1, 2y)th block of the other one of the base view image and the additional view image.

9. The method of claim 1, wherein when the combined image is divided into blocks of N rows and M columns, where x is an integer in a range of $0 \leq x < N/2$, y is an integer in a range of $0 \leq y < M$, and an (x, y)th block is located in the xth row and yth column, and the block combination pattern information of the combined image is the second pattern.

a (2x, y)th block of the combined image is a (2x, y)th block of any one of the base view image and the additional view image, and a (2x+1, y)th block of the combined image is a (2x+1, y)th block of the other one of the base view image and the additional view image.

10. The method of claim 1, wherein when the combined image is divided into blocks of N rows and M columns, where x is an integer in a range of $0 \leq x < N$, y is an integer in a range of $0 \leq y < M/2$, and an (x, y)th block is located in the xth row and yth column, the block combination pattern information of the combined image is the third pattern, an (x, 2y)th block of the combined image is an (x, 2y)th block of one of the base view image and the additional view image, and an (x, 2y+1)th block of the combined image is an (x, 2y+1)th block of the other one of the base view image and the additional view image.

11. The method of claim 1, wherein the block combination pattern information comprises a predetermined block combination pattern, in which the blocks of the base view image and the blocks of the additional view image are combined according to a block combination pattern selected by a user.

12. The method of claim 1, wherein according to the block combination pattern information, a block of the base view image is arranged in a first block location of the combined image, and a block of the additional view image, which has a highest similarity when using a disparity estimation method with a block in a second block location of the base view image, is arranged in a second location of the combined image, when the second block location is the same as the first block location.

13. An apparatus for generating a stereoscopic image bitstream, the apparatus comprising at least one processor for implementing:

a block divider , which divides a base view image and an additional view image into predetermined blocks having a predetermined size;

a combined image recorder, which records a combined image, the combined image generated by combining the blocks of the base view image and the blocks of the additional view image, in a payload area of the stereoscopic image bitstream; and a block combination pattern information recorder, which records, in a header area of the stereoscopic image bitstream, block combination pattern information about an order of arranging the blocks of the base view image and the blocks of the additional view image in the combined image, wherein the block combination pattern information indicates whether a pattern of the combined image is one of first, second and third patterns, and wherein the first pattern indicates that among blocks of the combined image, each block of the base view image is adjacent in vertical and horizontal directions to the blocks of the additional view image and each block of the additional view image is adjacent in vertical and horizontal directions to the blocks of the base view image, the second patter indicates that, among the blocks of the combined image, blocks of the same view image are serially arranged in the vertical direction and each block of the same view image is adjacent in the horizontal direction to blocks of the other view image, and the third pattern indicates that, among the blocks of the combined image, the blocks of the same view image are serially arranged in the horizontal direction and each block of the same view image is adjacent in the vertical direction to the blocks of the other view image.

14. The apparatus of claim 13, further comprising a frame arrangement pattern information recorder, which records, in the header area, frame arrangement pattern information about a pattern of arranging the blocks of the base view image and the blocks of the additional view image of the combined image according to a frame.

15. The apparatus of claim 14, wherein a block of the base view image is arranged in a first block location of a current frame of the combined image, a block of the additional view image is arranged in a second block location of the current frame of the combined image, and the frame arrangement pattern information indicates whether a first block location and a second block location of the current frame of the combined image are changed with a first block location and a second block location of a previous frame of the combined image.

16. The apparatus of claim 13, further comprising a block size information recorder, which records, in the header area, block size information about a size of the blocks of the base view image and the blocks of the additional view image.

17. The apparatus of claim 13, wherein according to the block combination pattern information, each block of the base view image and the additional view image is arranged in a same location as the combined image, and the blocks of the base view image and the blocks of the additional view image are alternatively arranged in any one direction of a vertical direction, a horizontal direction, and a diagonal direction.

18. The apparatus of claim 13, wherein the block size information comprises information indicating that a number of pixels in a row and a number of pixels in a column of the blocks are the same, or information indicating that the number of pixels in a row and the number of pixels in a column of the blocks are respectively determined.

19. A method of generating a stereoscopic image bitstream, the method comprising:

a payload area, in which a combined image, formed by combining a block of a base view image and a block of an additional view image, is recorded;

generating a header area, in which block combination pattern information about a pattern of arranging a block of the base view image and a block of the additional view image in the combined image, frame arrangement pattern information about a pattern of arranging a block of the base view image and a block of the additional view image in the combined image according to a frame, and block size information about a size of blocks of the base view image and the additional view image are recorded; and transmitting a stereoscopic image bitstream which comprises the payload area and the header area, wherein the block combination pattern information indicates whether a pattern of the combined image is one of first, second and third patterns, and wherein the first pattern indicates that, among blocks of the combined image, each block of the base view image is adjacent in vertical and horizontal directions to the blocks of the additional view image and each block of the additional view image is adjacent in vertical and horizontal directions to the blocks of the base view image. the second pattern indicates that, among the blocks of the combined image, blocks of the same view image are serially arranged in the vertical direction and each block of the same view image is adjacent in the horizontal direction to blocks of the other view image, and the third pattern indicates that, among the blocks of the combined image, the blocks of the same view image are serially arranged in the horizontal direction and each block of the same view image is adjacent in the vertical direction to the blocks of the other view image.

20. A non-transitory computer readable recording medium having recorded thereon a program for executing the method of claim 1.

* * * * *